United States Patent [19]

Nordblom et al.

[11] 4,178,216
[45] Dec. 11, 1979

[54] PROCESS FOR BIPOLAR ELECTRODE SUPPORT STRUCTURES

[75] Inventors: George F. Nordblom, Yardley, Pa.; Pierre P. Turillon, Ramsey, N.J.; Ernest L. Huston, Suffern; Stephan L. Keresztes, Warwick both of N.Y.

[73] Assignee: The International Nickel Company, Inc., New York, N.Y.

[21] Appl. No.: 930,554

[22] Filed: Aug. 3, 1978

Related U.S. Application Data

[62] Division of Ser. No. 878,268, Feb. 16, 1978, Pat. No. 4,124,746.

[51] Int. Cl.$^2$ .......................................... H01M 10/44
[52] U.S. Cl. ................................... 204/2.1; 429/210; 429/225
[58] Field of Search ..................... 429/210, 225–228; 204/2.1

[56] References Cited

U.S. PATENT DOCUMENTS 4,037,032   7/1977   Midola et al. ..................... 429/198

FOREIGN PATENT DOCUMENTS

2275897   6/1975   France .

Primary Examiner—Charles F. LeFevour
Attorney, Agent, or Firm—Lewis Messulam; Ewan C. MacQueen

[57] ABSTRACT

A bipolar electrode support structure for use in a lead acid battery is constituted by a porous matrix of valve metal, impregnated with lead or a lead alloy, and is provided on at least one surface thereof with a rim-portion at which little or no lead is exposed. The rim-portion is used to maintain an electrolyte-tight seal in operation.

27 Claims, 10 Drawing Figures

PROCESS FOR BIPOLAR ELECTRODE SUPPORT STRUCTURES

This is a division of application Ser. No. 878,268, filed Feb. 16, 1978 now U.S. Pat. No. 4,124,746.

FIELD OF THE INVENTION

This invention relates to lead-acid batteries which incorporate bipolar electrodes, and more specifically to improved structures which can be used in the manufacture of the bipolar electrodes of such batteries.

BACKGROUND OF THE INVENTION

The present invention relates to an improvement in a lead-acid bipolar electrode battery which is constructed in accordance with the process described in copending application for letters patent, Ser. No. 850,290, filed Nov. 10, 1977, and assigned in common with the present application. That copending application, which shall be referred to as the Turillon et al application, discloses novel battery support structures and processes for making such structures. The disclosed processes involve forming a porous matrix of a valve metal or an alloy which exhibits valve metal-like electrical characteristics, impregnating that matrix with lead or a lead alloy and thereafter oxidizing part of the lead to lead dioxide. The Turillon et al application discloses, inter alia, the utility of such lead-impregnated valve metal structures to a bipolar electrode lead-acid battery.

A bipolar electrode lead-acid battery embodying lead-impregnated valve metal support structures can consist of a series of sheet-like electrodes stacked in parallel to one another. The end electrodes of the stack would support respectively positive and negative active mass, whereas the intermediate electrodes would be bipolar each supporting positive active mass on one face and negative active mass on the opposite face. Each of these electrodes might consist simply of a lead-impregnated titanium matrix with the active mass applied to opposite faces thereof, or alternatively the electrode support structure may be a composite consisting in part of a lead-impregnated titanium matrix and in part of a solid mass of metal bonded to that matrix.

Such a battery can be described as a plurality of series-connected cells where each cell is bounded by the positive portion of a bipolar electrode and the negative portion of the adjacent bipolar electrode. The electrolyte, i.e. the battery acid, within each of these cells has to be isolated from the electrolyte in the other cells. This is ensured by an appropriate construction of cell-walls which cooperate with the electrodes to define the individual isolated cell compartments. For the sake of convenience we will describe a battery which is generally cylindrical in shape and features disc-shaped electrodes. It will be understood that the invention is by no means limited to this particular circular configuration. A convenient construction for a cylindrical type of battery involves the use of disc-shaped electrodes and cell-wall members which are tubular and are urged into an electrolyte-tight contact with a respective pair of adjacent electrodes. The seal, which will take place at or near to the disc edges can be a direct cell wall to electrode seal if the cell wall members are of suitable resilience, or alternatively an intermediate sealing device such as an 'O' ring may be employed between the cell wall member and the electrode.

When such a bipolar-electrode battey includes electrodes one or both surfaces of which is, for example, a lead-infiltrated titanium matrix, problems have been found to arise in maintaining an electrolyte-tight seal between the electrode and its respective cell wall member. Thus we have found that even if a good seal is present at the time of assembly of the battery, there is a tendency upon use of the battery during a number of charge-discharge cycles for the electrolyte to begin to seep across the seal at various places and hence pass out of its individual cell compartment. This phenomenon, which we refer to as 'electrolyte creep', is observed in particular at the positive face of a bipolar electrode and if unchecked would place a severe limitation on the useful life of the battery.

OBJECT OF THE INVENTION

It is an object of the invention to provide improved battery electrode support structures of the lead-impregnated valve metal type, and processes for manufacturing them, whereby the above-mentioned electrolyte creep problem is minimized or obviated when the structures are incorporated in a bipolar electrode lead-acid battery.

SUMMARY OF THE INVENTION

The invention is based on the discovery that electrolyte creep at a cell wall to electrode seal can be avoided by so constructing the electrode that the portion of its surface which cooperates with the seal contains little or no lead accessible to the electrolyte. Thus we have found that where a seal was effected between a cell wall member and a surface of pure titanium no electrolyte creep was observed even on prolonged usage.

Accordingly the present invention provides a bipolar electrode support structure for use in a lead-acid battery comprising a sheet-like member having a first side adapted to support positive active mass and a second side adapted to support negative active mass wherein:

(i) at least a portion of said member adjacent said first side comprises a continuous matrix of a metal selected from titanium, tantalum, niobium and zirconium, or of an alloy of said metal which alloy exhibits valve metal-like electrical characteristics;

(ii) said matrix has tortuous paths therethrough, the volume of which constitutes about 15 to 55% of the combined volume of said matrix and paths;

(iii) said paths are filled adjacent said first side with essentially lead dioxide such that in use said dioxide blocks entry of battery electrolyte into said matrix;

(iv) at least part of the remainder of said paths is filled with lead or a lead alloy in electronic conductive contact with said matrix and said dioxide;

(v) the extent of penetration of said dioxide from said first side is such as to ensure that in operation the voltage drop between said first side and the lead dioxide-lead metal or alloy interface is sufficient to substantially inhibit anodic formation of any oxidic product of metal at said interface; and (vi) said first side includes a rim-portion adjacent the whole perimeter of said member, said rim-portion being characterized in that less than 10% of the outer surface thereof is constituted by lead-containing material.

The expression "sheet-like" is used to denote a member which is very small in one dimension (its thickness) by comparison with its other two dimensions. It is not however intended to restrict the support structure to one having planar faces, and indeed the support structure may be in the form of a curved sheet.

The expression "valve-metal" is used in this specification and claims to denote a metal which when in contact with acid battery electrolyte will readily permit current to pass between the metal surface and the electrolyte providing the metal is made cathodic, but will rapidly passivate when the current is reversed by formation of a non-conductive anodic film on the metal surface. Such electrical characteristics are exhibited by the metals titanium, niobium, tantalum and zirconium as well as various alloys containing more than about 85% of these metals.

Unless otherwise specified all percentages quoted herein are percentages by weight.

The expression "lead alloy", used in the context of the infiltrating metal, denotes alloys which are rich in lead and which are electrochemically oxidizable to form lead dioxide. The latter term is not intended to be limited to the precise stoichiometric compound $PbO_2$, but rather includes non-stoichiometric species, such as $PbO_{1.9}$, which are well known to have enhanced electrical conductivity compared with the true stoichiometric compound. The lead alloy can contain in particular any of various dopants such as Ca, As, Sb, Sn, Al, Ag, etc. which are known to impart thereto desired electrical characteristics.

According to a particular embodiment of the invention, a bipolar electrode support structure may comprise a sheet-like composite member which includes:

a solid sheet of an electronically conductive material which is inert to battery electrolyte;

a continuous matrix of metal or alloy selected from titanium, tantalum, niobium, zirconium, and alloys thereof which exhibit valve metal-like electrical characteristics, said matrix being metallurgically bonded to a surface of said solid sheet and having therein a plurality of tortuous paths, the volume of which constitutes about 15–55% of the combined volume of said matrix and said paths;

any of said paths which communicate with the matrix surface remote from said solid sheet having lead dioxide therein such that in use said dioxide blocks entry of battery electrolyte into said matrix;

at least part of the remainder of said paths being filled with lead or a lead alloy in electronic conductive contact with said matrix and said dioxide;

the extent of penetration of said dioxide from said remote surface being such as to ensure that in operation the voltage drop between said remote surface and the lead dioxide-lead metal or alloy interface is sufficient to substantially inhibit anodic formation of any oxidic products of metal at said interface; and the relative dimensions of said solid sheet and said matrix being such that a rim-portion adjacent the whole perimeter of said solid sheet is not covered by said matrix.

In practice, the solid sheet used in such an embodiment can conveniently be a sheet of the same metal or alloy which constitutes the porous matrix. This is not essential however, and the sheet might be made, for example, of a ceramic material.

Inasmuch as the structures of the present invention embody the matrix impregnation concepts described in the aforementioned Turillon et al application, the specification of the copending application is hereby incorporated by reference so that the following description of the present invention will for the sake of convenience include only brief details of features described more fully in the Turillon et al specification.

DETAILED DESCRIPTION OF THE EMBODIMENTS

Figure 1:
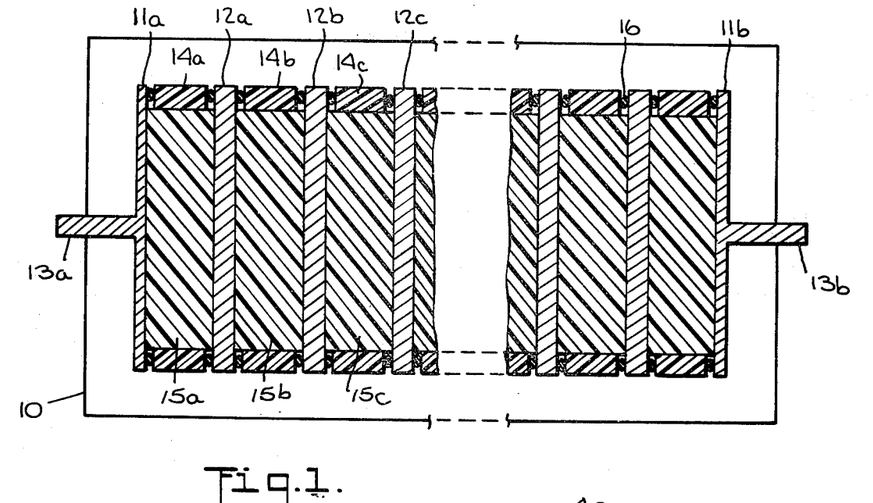
FIGS. 1 and 1A are schematic illustrations of, respectively, a longitudinal cross section through a battery in which the present invention can be embodied, and a partially cut-away perspective view of the same battery.
Figure 1A:
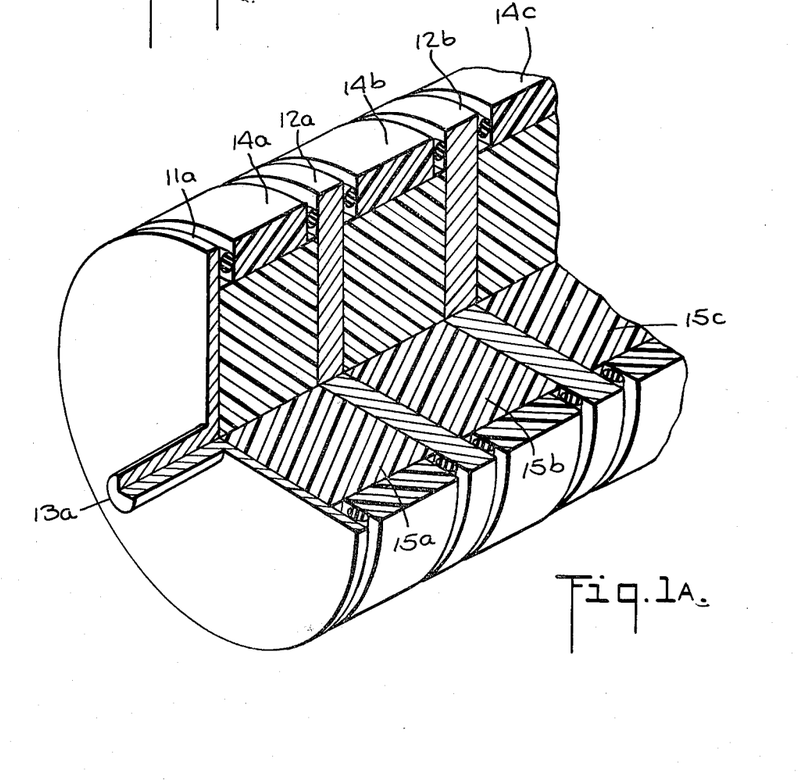

The battery illustrated diagramatically in FIGS. 1 and 1A consists of a generally cylindrical outer housing 10 within which are located a plurality of disc-shaped electrodes 11 and 12, of which the end electrodes 11a and 11b are unipolar while the intermediate electrodes 12a, 12b, 12C, etc. are bipolar. The end electrodes are connected to terminals 13a and 13b which traverse the casing 10. Separating adjacent electrodes are a plurality of cell wall members in the form of short tubular structures 14a, 14b, 14c, etc. Each of these cell wall members is urged into contact with a rim-portion of adjacent electrodes and sealing devices, in the form of "O" rings 16, enable an electrolyte-tight seal to be maintained between the cell wall member and a respective pair of electrodes. In this way electrodes 11a and 12a, together with the cell wall member 14a define a closed space which constitutes an individual electrolyte compartment. Within each electrolyte compartment is a separator 15a, 15b, 15c, etc., which will generally comprise a porous or fibrous structure made of a lightweight material inert to the battery electrolyte, which structure is capable of being subjected to pressure without collapsing of its pores or forcing out of the electrolyte retained therein.

Each of the bipolar electrodes 12 comprises a support structure in the form of a valve metal matrix, infiltrated with lead which has been oxidized to lead dioxide near one of the matrix surfaces. This support structure supports a layer of lead or lead alloy on one side thereof which layer in operation constitutes the negative active mass, and a layer of lead dioxide on the opposite side thereof, which layer in operation constitutes the positive active mass. The positive active mass may be pasted directly onto the infiltrated valve-metal matrix, or alternatively a valve-metal grid may be bonded onto the matrix to aid the retention of the positive active mass. For the sake of simplicity no attempt has been made in FIGS. 1 and 1A to represent the true surface profile of each electrode, nor to delineate the support and active mass components thereof. The electrodes are represented merely schematically as being generally disc-shaped.

Figure 2:
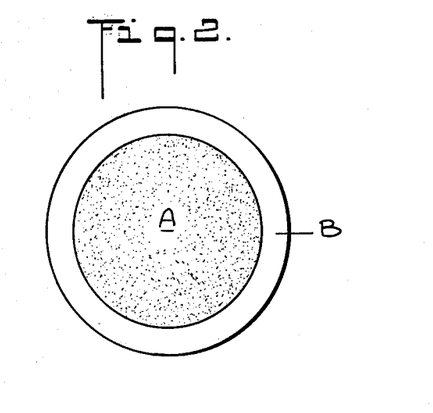
FIG. 2 is a schematic illustration of the surface of a disc-shaped electrode in accordance with the invention, which can be used in the battery shown in FIG. 1.

FIG. 2 shows the positive surface of one of the bipolar electrodes used in the battery of FIG. 1. This surface is covered with positive active mass A over all but a rim-portion B. The rim-portion B constitutes an area of the electrode support structure which cooperates with the cell wall member to provide a seal. In accordance with the invention the area B or at least the portion thereof which contacts the sealing means 16 must be low in, or free of, lead. Thus whereas the support structure surface on which the active mass A is applied can have lead dioxide which occupies 30% or more of the surface area, the area B or at least the seal-receiving portion thereof must have less than 10% of its surface area constituted by lead-containing material. Preferably that seal-receiving surface is lead-free.

A preferred method of achieving a low-lead or lead-free rim-portion on a support structure comprises applying compressive stresses to the valve metal matrix, during its production and prior to its infiltration with lead, so as to inhibit the infiltration of the desired rim-portion by the lead. Thus a support structure can be made as follows:

(i) a porous matrix is prepared by powder-rolling a titanium powder to a density of, or example, 70% of the theoretical maximum;

(ii) the rolled sheet is cut into blanks of the desired shape;

(iii) each blank is then placed in a die of suitable shape and compressed to compact the rim-portion;

(iv) the compacted blank is subjected to sintering;

(v) if necessary the sintered blank is further compacted in a die to ensure that at least at the surface of the rim-portion the porosity does not exceed 10% by volume and preferably is much less;

(vi) the blank is now infiltrated with molten lead; and (vii) the infiltrated blank is then anodically oxidized in a suitable electrolyte, e.g., aqueous sulfuric acid, to convert part of the lead to its dioxide.

Figure 3:
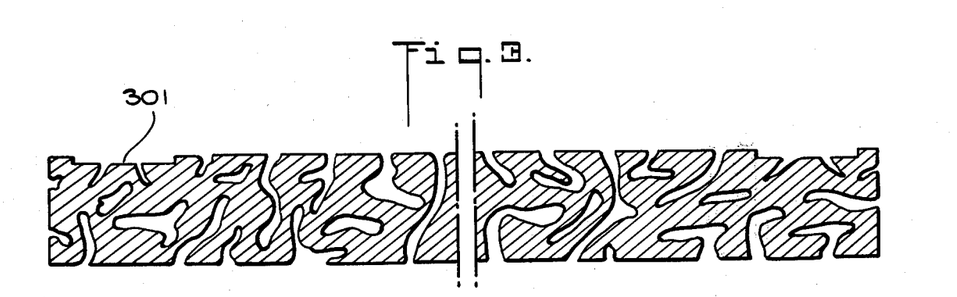
FIGS. 3 to 9 are schematic illustrations of the structure of various alternative embodiments of the present invention.

The die used for compacting the rim portion can be one which is embossed on only one face thereof in which case the resulting infiltrated support structure will be shaped as shown in FIG. 3, with a low-lead rim portion 301 on only one of its faces, which face is used as the positive-mass supporting face.

Figure 4:
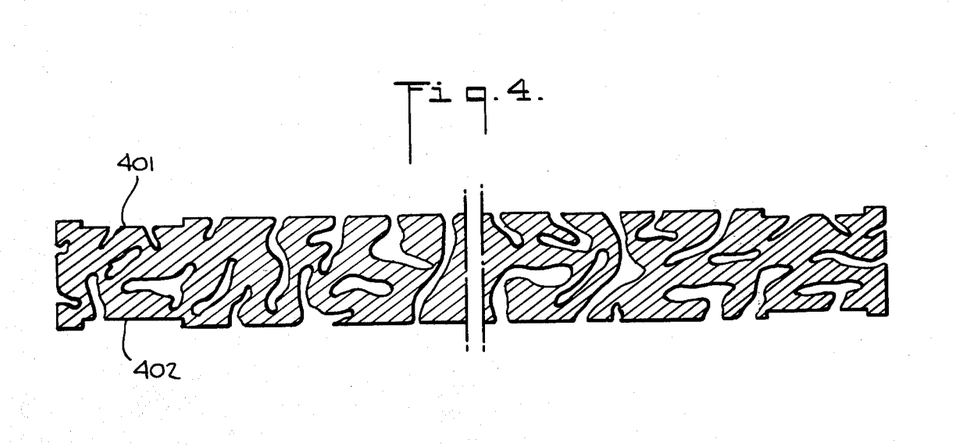

Alternatively, while not essential, it may be preferred to compact the rim-portion symmetrically by use of a die embossed on both sides. FIG. 4 shows the resulting shape of the support member which would have low-lead rim-portions 401 and 402 on both the positive mass-bearing and the negative mass-bearing surfaces thereof.

Figure 5:
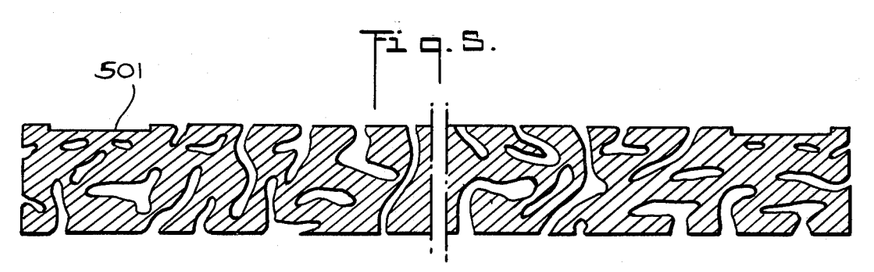

As an alternative to applying local compaction to inhibit infiltration of a selected portion of the matrix surface, the desired result of ensuring a localized lead-free area can be achieved by sealing the pores in the desired rim-portion of the surface so that these pores are inaccessible to the electrolyte. One method of achieving this comprises resorting to the technique known as "glazing", wherein laser heat is used to bring about local melting of the valve metal at the surface in the vicinity of the pores such that it collapses and seals off the pores. Alternatively the same result can be achieved by a machining operation wherein a tool is forced against the desired surface at which the pores are to be sealed. Yet another alternative involves the use of shot peening to provide the necessary mechanical deformation of the rim-portion of the matrix surface. When any of these techniques is used, the resulting matrix will be as indicated in FIG. 5 in which the unshaded areas represent the pores into which lead is subsequently infiltrated. When such a structure has been infiltrated, the rim-portion 501 will represent a lead-free area which is exposed to the electrolyte.

Figure 6:
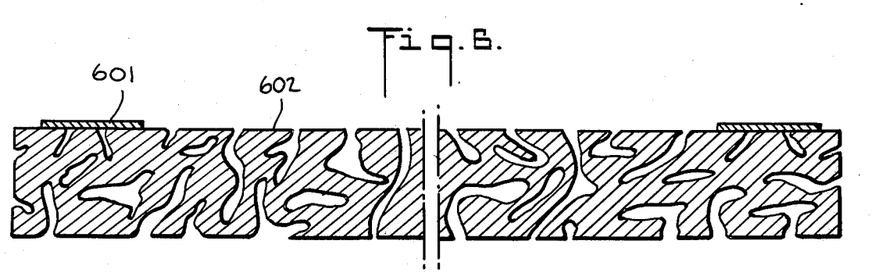

FIG. 6 illustrates an electrode support structure in which a lead-free rim-portion is provided on one of the surfaces 602 by means of a thin layer of valve metal 601 applied to the selected portion of the surface. The provision of an annular surface of, for example, titanium on the porous matrix can be achieved by any known metal coating technique, by suitably masking the surface 602 and thereafter plasma spraying the desired coating onto the rim-portion, or by sintering an annulus of solid titanium onto the matrix surface. The titanium coating or solid annulus can be applied either to the porous matrix or after its impregnation with lead.

Figure 7:
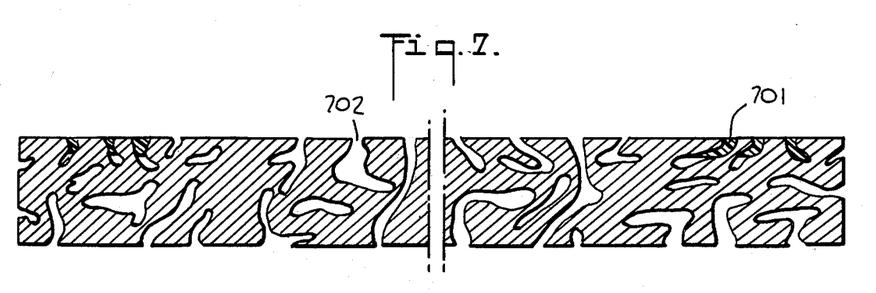

FIG. 7 illustrates yet another alternative method of achieving the desired lead-free rim-portion on a surface of a porous matrix. In this embodiment the pores which communicate with the rim-portion are filled at least in part with an inert material such as a plastic or a ceramic composition indicated by the dark area 701 in the drawing. This operation of plugging selected pores 701 will be conveniently done prior to infiltration of the remaining pores 702 with lead. In such a case it is essential that the inert material used be one that will not only withstand prolonged exposure to the battery electrolyte but also one that is capable of withstanding the temperatures used in the lead infiltration operation. Where a ceramic plug is to be used, this might be conveniently applied by brushing on a suspension of, for example, silica particles and thereafter evaporating to dryness.

An alternative technique for achieving the same result involves performing the infiltration operation, then leaching the infiltrated lead from the pores which are to be plugged and thereafter plugging the resulting cavities with the inert material. While more elaborate than the pre-infiltration procedure, this alternative permits a wider range of inert materials to be used, inasmuch as stability of the material at temperatures at least as high as the melting point of lead would no longer be a requirement.

The inert material used to plug the selected pores may be integral with, or bonded to, the cell wall member which is to be used in cooperation with the electrode. Thus for example a tubular plastic cell wall member can be chemically treated to soften one of its edges and the softened edge can then be forced into the rim-portion of the matrix so as to become embedded into the pores which are to be plugged. A further alternative involves plugging the selected matrix pores with an appropriate cement, such as an epoxy resin, and using the latter to bond the tubular cell wall member to the rim-portion of the matrix surface.

Yet another method of overcoming the electrolyte creep problem in accordance with the present invention involves making use of a composite electrode support structure which consists of solid and infiltrated matrix components, metallurgically bonded to one another. Two such embodiments are illustrated schematically in FIGS. 8 and 9. The embodiment of FIG. 8 comprises a relatively thin sheet of titanium 801, to which are bonded porous matrices 802 and 803 on opposite sides of the sheet. The matrices are shown as covering the respective surfaces of the sheet only partially so that a portion of the sheet remains to constitute the desired lead-free rim-portion which receives the cell wall sealing device. Such a support structure can be produced by starting with a titanium sheet of the desired shape and size, e.g., disc-shaped, placing loose titanium powder or a pre-formed disc of matrix onto part of its surface or surfaces and thereafter sintering to cause the titanium powder particles to become bonded to one another as well as to the sheet surface. The composite support structure can then be infiltrated with lead, and that lead subjected to electrolytic oxidation in known manner.

Figure 8:
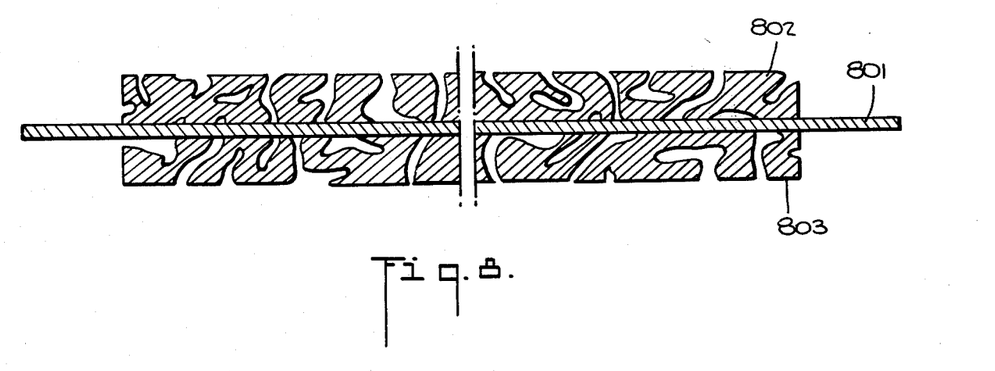
Figure 9:
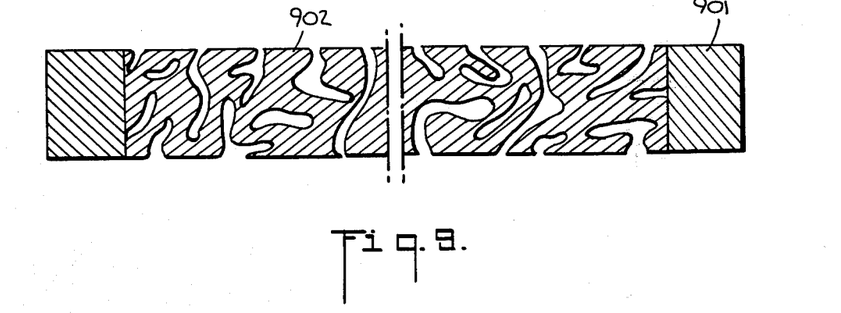

The embodiment of FIG. 9 offers the possibility of producing a composite electrode support structure of ligher weight than that shown in FIG. 8. The composite structure of FIG. 9 is produced by forming a solid mass of titanium in the shape of the desired lead-free rim. Such a solid mass might be produced from titanium sheet by cutting out a coupon of appropriate size and shape, and thereafter cutting out a central opening to leave only the rim-portion 901 which would be annular in the case of a disc-shaped electrode. Loose titanium powder or a disc of porous matrix can then be supported within, or forced into, the aperture of the rim and sintered to produce a matrix 902 bonded at its edge to the rim 901. It should be mentioned that whereas in the illustrated embodiment the rim and matrix are shown to be of equal thickness this is not essential, and, for the sake of economy or weight reduction, the rim 901 may be substantially thinner than the matrix 902.

Having described various electrode support structures and processes for producing them, we will now describe the results of tests illustrating the production of structures in accordance with the invention as well as their effectiveness in overcoming electrolyte creep problems.

EXAMPLES

Preparation of Electrode Support Structures

As starting material for all of the specimens prepared, a porous matrix of titanium was used, which had been prepared in the following manner. Titanium sponge powder of minus 60 mesh (Tyler) particle size was rolled, at ambient temperature and atmosphere, to produce a green strip approximately 1.5 mm thick and having a density of about 70% of the theoretical value (i.e. a 30% by volume porosity). Blanks were cut from this green strip in the form of 5 cm square specimens.

A first set of such specimens were used to produce electrode support structures, in accordance with one aspect of the invention, by relying on localized compaction of the porous matrix to ensure a low-lead rim-portion in the final structures. Each blank was placed in a steel die having an embossed surface designed to apply pressure to an annular area near the edges of the specimen. The region to be compacted represented about 6.5 cm$^2$ on each face of the blank. An effective pressure of about 215 Megapascals (MPa) was applied to this annular region, as a result of which the porosity in the compacted rim-portion was found to have decreased to about 15% by volume. Following this 'coining' operation the blank was sintered in an argon atmosphere at 1000° C. for 30 minutes and thereafter re-coined by replacing it in the die and subjecting the rim-portion to a pressure of about 540 MPa. This resulted in the porosity of the rim-portion being decreased to 7–9% by volume.

To aid the eventual bonding of battery active mass to the support structures, grids of expanded titanium mesh were bonded on both faces of the compacted area. Each screen was mounted onto the area enclosed by the rim-portion, and spot welded to the matrix surface. The assembly was then immersed in a bath of molten lead-tin alloy (0.5% Sn) at 550° C. for 15 minutes to infiltrate the alloy into the pores of the matrix. Because of the aperture size of the titanium grid, the molten alloy did not become retained so as to fill the grid but was retained mostly within the matrix pores. The observed weight gains of the specimens were in the region of 80% upon infiltration. Microscopic examination of the surface as well as the cross-section of such a blank after infiltration showed that the annular region which had been subjected to the double-coining operation presented an external surface consisting almost entirely of titanium, inasmuch as less than 9% of the surface consisted of exposed lead alloy.

A second set of green strip blanks were used to produce a plurality of electrode support structures in accordance with another aspect of the invention, namely ensuring a low-lead region on the surface by resorting to an inert material to seal pores of the matrix in the desired region. In this case grids of titanium mesh were placed in contact with the green strip and the assembly sintered at 1000° C. in argon for 30 minutes. The sintering resulted not only in bonding together the particles within the matrix but also in providing a good bond between the matrix and the superimposed screen. After the sintering, the assembly was infiltrated in the manner described above and weight gains of about 100% were observed. The lead-free rim-portion was then produced in the following manner. A mask was provided by painting onto the surfaces of the blank a commercially available masking solution, inert to nitric and hydrofluoric acids, so as to leave exposed only an annular region of each surface. The masked specimens were then immersed in a solution consisting, in percentage by volume, of 4% HF, 14% HNO$_3$ and 82% H$_2$O for a period of 10 minutes to etch the lead alloy out the matrix pores in the unmasked annular region. Weight losses of about 0.5% were detected after this etch.

The etched specimens were then washed with acetone to dissolve the masking agent and the cavities created by the etch were sealed with polyvinyl chloride in one of two manners. In the first case a polyvinyl chloride tube, having internal and external diameters selected to correspond with those of the annular region to be sealed, was bonded to the annual region by applying a vinyl cement to the specimen surface and the tube end and urging them into contact. In the second case a similar procedure was used except that a polyvinyl chloride cement (PVC monomer in acetone) was employed to bond the tube to the etched rim-portion of the matrix.

Testing Procedure and Results

Two types of tests were carried out to determine the effectiveness of electrode support structures in accordance with the invention. The first type of test can be designated as a creep test inasmuch as the object was to determine whether and to what extent battery acid would creep through a seal formed at the rim-portion of each specimen. Such creep tests were performed on the support structures as prepared by various ones of the techniques described above, as well as on comparative specimens. In addition to the creep tests, confirmatory tests were carried out by applying active mass to the specimens and assembling them into test cells which were put through charge-discharge cycles.

The creep testing procedure was as follows. A specimen to be tested was placed on a plastic base-plate with the surface to be tested uppermost. A tubular plastic member, 4 cm high and having internal and external diameters of 2.5 cm and 4 cm respectively, was placed over the test face of the specimen, with an 'O' ring coated with silicone grease positioned between the bottom of the tube and the rim-portion of the specimen surface. A flat plastic cover was superimposed on the plastic tube. The cover had two off-center holes through one of which a 0.6 cm diameter lead wire cathode was inserted into the tubular cavity. The other hole in the cover provided a port for introducing liquid into the cavity. The whole structure was mounted in a rack such that screw pressure could be applied to the center of the cover to effect a seal at the 'O' ring. In this way an electrolyte compartment was formed with the test specimen constituting the floor thereof. Sulfuric acid of 1.28 specific gravity was used in the compartment, and a constant current source was used to maintain a current of 3 milliamperes (mA) between the lead cathode and the test specimen. Such a current was maintained continuously until failure was detected (visually or with the aid of pH test paper) in the form of acid leakage through the seal. Table 1 below shows the results of these creep tests.

The comparative tests showed that lead-infiltrated matrices of the type used in the specimens according to the invention would have a life expectancy of only 3-4 days. On the other hand providing a low-lead or lead-free rim portion in specimens 1-3 resulted in the specimens' surviving for the duration of the testing periods. Since the sealing area for specimen 3 was the surface of a solid titanium surface, the same good result should be obtainable with specimens constructed in either of the manners illustrated in FIGS. 6 and 9.

TABLE 1

| Specimen | Type | Days to Failure |
|---|---|---|
| A | Comparative specimen of Ti matrix, of 25.5% volume porosity, infiltrated with lead alloy (0.5% Sn). | 3 |
| B | Comparative specimen similar to A except that porosity was 31.8% by volume. | 4 |
| 1 | Specimen having rim portion produced by the double-coining technique described above. | >60** |
| 2 | Specimen having rim portion produced by the above described machining technique for sealing the pores. | >60** |
| 3 | Composite specimen as above described and as illustrated in FIG. 8. | >94* |

*test discontinued
**up to now

Two further creep tests were conducted in a similar manner to that described above except that the plastic tubing was bonded to the specimen instead of being sealed to it via an 'O' ring. In both cases the specimen was one which had been subjected to the leaching technique after infiltration to remove lead from pores in the rim portion thereof. After the leach, the PVC tubing which was to constitute the compartment side-wall, was bonded onto the rim-portion of the specimen. In one case, specimen 4, the bonding agent was PVC cement while in the other case, specimen 5, an epoxy resin was used. Upon testing, specimen 4 withstood 47 days of current flow before signs of electrolyte creep were detected. Specimen 5 has been on test continuously for 60 days so far and no sign of failure has been detected.

The support structures to be tested were incorporated into test cells in the following manner. Each specimen intended as a bipolar electrode support was masked and lead plated so as to form a lead coating on all but the rim-portion of one of its faces. Positive active mass was pasted onto that one face while negative active mass was pasted onto the opposite face. The electrodes were then assembled in the manner illustrated in FIG. 1A using plastic cell wall members to separate the electrodes. Between adjacent electrodes a plurality of corrugated PVC sheets were interposed to constitute the electrode retaining means. Tightening up of the assembly resulted in compressing the electrode separator sheets against one another and against the electrode surfaces. The cells were then filled with sulfuric acid of 1.06 specific gravity through apertures provided in the cell wall members. A forming current, determined by the known weight of active mass, was passed through the cells over a 72 hour period. Passage of this forming current through the cell results not only in chemical changes within the body of active mass on the exterior of each electrode, but also in anodic oxidation of part of the infiltrating lead alloy contained within the matrix pores of the support structure beneath the active mass. As a result, when the forming treatment is complete, the pores of the matrix are filled with lead dioxide at the positive face of the support structure and up to a predetermined depth from that face.

After the forming treatment, the electrolyte was replaced by sulfuric acid of 1.28 specific gravity, and the cells put through cyclic discharging and charging. Several cells were constructed in this way using support structures prepared by the techniques involving:
 (a) coining to compact the rim portion;
 (b) machining to seal-off pores in the rim portion;
 (c) composite construction to provide a lead-free rim-portion; and
 (d) leaching lead from the rim portion and sealing with plastic.

In each case a 4 volt bipolar cell was constructed comprising an anode, a cathode and a bipolar electrode therebetween. All of the cells performed in a satisfactory manner through 6-7 cycles of charge and discharge.

In the foregoing description, emphasis has been placed on details of the structures and process which are germane to the concepts of the present invention, rather than those details which are common to any bipolar electrode battery or which are common to any infiltrated matrix type of construction. Such common details will be readily known to those skilled in the art or may be ascertained by reference to the aforementioned Turillon et al application. Moreover the present invention has been described in conjunction with preferred embodiments and particular reference has been made to cylindrical pile-type batteries, and to lead-infiltrated titanium matrices. It is to be understood that references to disc-shapes and to particular metals are merely for illustrative purposes, and many modifications and variations of the described embodiments may be resorted to without departing from the scope of the invention, which is defined by the appended claims.

We claim:
1. A process for producing a sheet like article of manufacture adapted for use as a bipolar electrode support structure for a lead-acid battery, the process comprising:
 forming a continuous, porous matrix in the configuration of said article, said matrix being constituted of a metal selected from titanium, tantalum, niobium and zirconium, or of an alloy of said metal which alloy exhibits valve metal-like electrical characteristics;

mechanically deforming a rim-portion of said matrix thereby decreasing the pore dimensions at least adjacent a preselected portion of a surface of said matrix, thereby inhibiting lead infiltration into said preselected portion of matrix surface during the next step of the process;

infiltrating said matrix with lead or lead alloy such that pores which communicate with the remainder of said surface are filled to a depth exceeding a first predetermined depth from said surface; and electrochemically oxidizing said lead or lead alloy so as to ensure that said pores which communicate with said remainder of said surface are filled with lead dioxide to a depth which exceeds a second predetermined depth from said surface, but is less than said first predetermined depth.

2. A process as claimed in claim 1 wherein said step of mechanically deforming comprises compressing said matrix in a die shaped to apply pressure essentially only to said rim-portion of said matrix.

3. A process as claimed in claim 2 wherein said step of forming said matrix comprises loosely compacting a powder and thereafter subjecting the resulting compact to a sintering operation; and wherein said compressing is carried out, at least in part, prior to said sintering operation.

4. A process as claimed in claim 1 wherein said matrix comprises a circular disc and said rim-portion constitutes an annular portion adjacent the edge of said disc.

5. A process for producing a sheet-like article of manufacture adapted for use as a bipolar electrode support structure for a lead-acid battery, the process comprising:

forming a continuous, porous matrix in the configuration of said article, said matrix being constituted of a metal selected from titanium, tantalum, niobium and zirconium, or of an alloy of said metal which alloy exhibits valve metal-like electrical characteristics;

infiltrating pores which communicate with, and are adjacent to a preselected portion of a surface of said matrix with a sealing material inert to battery electrolyte;

infiltrating said matrix with lead or a lead alloy such that pores which communicate with the remainder of said surface are filled to a depth exceeding a first predetermined depth from said surface; and electrochemically oxidizing said lead or lead alloy so as to ensure that said pores which communicate with said remainder of said surface are filled with lead dioxide to a depth which exceeds a second predetermined depth from said surface, but is less than said first predetermined depth.

6. A process as claimed in claim 5 wherein said sealing material is a ceramic or plastic composition which is resistant to temperatures at least as high as the melting point of lead.

7. A process as claimed in claim 5 wherein said matrix comprises a circular disc and said preselected portion constitutes an annular portion of said surface adjacent the edge of said disc.

8. A process for producing a sheet-like article of manufacture adapted for use as a bipolar electrode support structure for a lead-acid battery, the process comprising:

forming a continuous, porous matrix in the configuration of said article, said matrix being constituted of a metal selected from titanium, tantalum, niobium and zirconium, or of an alloy of said metal which alloy exhibits valve metal-like electrical characteristics;

infiltrating said matrix with lead or a lead alloy such that pores which communicate with a surface of said matrix are filled to a depth exceeding a first predetermined depth from said surface;

treating a preselected portion of said surface so as to remove said lead or lead alloy from pores which are adjacent to and communicate with said portion of said surface; and electrochemically oxidizing said lead or lead alloy so as to ensure that said pores which communicate with the remainder of said surface are filled with lead dioxide to a depth which exceeds a second predetermined depth from said surface, but is less than said first predetermined depth.

9. A process as claimed in claim 8 wherein said treatment of said preselected portion of said surface comprises contacting said preselected portion with a lixiviant effective to dissolve said lead or lead alloy.

10. A process as claimed in claim 8 including the additional step of at least partly filling said pores from which said lead or lead alloy has been removed with a sealing material inert to battery electrolyte.

11. A process as claimed in claim 8 wherein said matrix comprises a circular disc, and said preselected portion comprises an annular portion of said surface adjacent the edge of said disc.

12. A process of producing a sheet-like article of manufacture adapted for use as a bipolar electrode support structure for a lead-acid battery, the process comprising;

forming a continuous, porous matrix in the configuration of said article, said matrix being constituted of a metal selected from titanium, tantalum, niobium and zirconium, or of an alloy of said metal which alloy exhibits valve metal-like electrical characteristics;

subjecting a preselected portion of a surface of said matrix to a surface treatment which is effective seal off any pore openings in said preselected portion of said surface;

infiltrating said matrix with lead or a lead alloy such that the pores which communicate with said surface are filled to a depth exceeding a first predetermined depth from said surface; and electrochemically oxidizing said lead or lead alloy so as to ensure that said pores which communicate with said surface are filled with lead dioxide to a depth which exceeds a second predetermined depth from said surface, but is less than said first predetermined depth.

13. A process as claimed in claim 12 wherein said surface treatment comprises mechanical deformation of said surface.

14. A process as claimed in claim 13 wherein said mechanical deformation is effected by a machining operation.

15. A process as claimed in claim 13 wherein said mechanical deformation is effected by a shot-peening operation.

16. A process as claimed in claim 12 wherein said surface treatment comprises a metal-coating operation whereby said metal or alloy which constitutes said matrix is applied onto said preselected portion of said surface.

17. A process as claimed in claim 12 wherein said matrix comprises a circular disc, and said preselected portion comprises an annular surface adjacent the edge of said disc.

18. A process for producing a sheet-like article of manufacture adapted for use as a bipolar electrode support structure for a lead-acid battery, the process comprising:
   forming a solid sheet-like mass of an electronically conductive material which is inert to battery electrolyte;
   forming a continuous, porous matrix of a metal selected from titanium, tantalum, niobium and zirconium, or an alloy of said metal which alloy exhibits valve metal-like electrical characteristics, said matrix being metallurgically bonded to a surface of said solid mass such that all but a predetermined rim-portion of said surface is covered by said matrix;
   infiltrating said matrix with lead or a lead alloy such that pores of said matrix communicating with the matrix surface remote from said solid mass are filled to a depth exceeding a first predetermined depth from said matrix surface, and
   electrochemically oxidizing said lead or lead alloy so as to ensure that said pores communicating with said remote matrix surface are filled with lead dioxide to a depth which exceeds a second predetermined depth from said remote surface, but is less than said first predetermined depth.

19. A process as claimed in claim 18 wherein said step of forming said matrix comprises placing loose powder of said metal or alloy onto said surface of said solid mass and subjecting said powder to a sintering operation to produce said metallurgical bonding.

20. A process as claimed in claim 18 wherein said step of forming said matrix comprises pre-forming said matrix to a desired shape, supporting said shape in contact with said surface of said solid mass, and subjecting said supported shape to a sintering operation to produce said metallurgical bonding.

21. A process as claimed in claim 18 wherein said solid mass comprises a sheet of the same metal or alloy as said matrix.

22. A process as claimed in claim 18 wherein said solid mass comprises a circular disc and said rim-portion comprises an annular area adjacent the edge of said disc.

23. A process producing a sheet-like article of manufacture adapted for use as a bipolar electrode support structure for a lead-acid battery, the process comprising: forming a solid mass of an electronically conductive material which is inert to battery electrolyte, said mass being in the form of a sheet-like member having a central aperture cut out therefrom;
   forming within said aperture a continuous porous matrix of a metal selected from titanium, tantalum, niobium and zirconium, or of an alloy of said metal which alloy exhibits valve metal-like electrical characteristics, said matrix having surfaces which are parallel to the surfaces of said sheet-like member, and being metallurgically bonded to the outer edges thereof to said solid mass;
   infiltrating said matrix with lead or a lead alloy, such that pores of said matrix which communicate with at least one of said matrix surfaces are filled to a depth exceeding a first predetermined depth from said at least one surface; and
   electrochemically oxidizing said lead or lead alloy so as to ensure that said pores which communicate with said at least one surface are filled with lead dioxide to a depth which exceeds a second predetermined depth from said at least one surface, but is less than said first predetermined depth.

24. A process as claimed in claim 23 wherein said solid mass is comprised of the same metal or alloy as said matrix.

25. A process as claimed in claim 23 wherein said matrix forming operation comprises supporting loose powder of said metal or alloy which constitutes said matrix such that said loose powder fills said aperture in said solid mass; and
   subjecting said supported powder to a sintering operation to effect said metallurgical bonding.

26. A process as claimed in claim 23 wherein said matrix forming operation comprises pre-forming said matrix to a shape which fits closely within said aperture;
   pressing said preformed shape into said aperture; and
   subjecting said preformed shape to a sintering operation to effect said metallurgical bonding.

27. A process as claimed in claim 23 wherein said solid mass comprises a flat sided annular member.

* * * * *